United States Patent
Wang (10) Patent No.: US 12,507,205 B2
(45) Date of Patent: Dec. 23, 2025

(54) PAGING INDICATION METHOD AND APPARATUS, AND TERMINAL DEVICE AND NETWORK DEVICE

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 419 days.

(21) Appl. No.: 18/145,338

(22) Filed: Dec. 22, 2022

(65) Prior Publication Data
US 2023/0199715 A1    Jun. 22, 2023

Related U.S. Application Data

(63) Continuation of application No. PCT/CN2020/125524, filed on Oct. 30, 2020.

(51) Int. Cl.
H04W 68/02 (2009.01)
H04W 48/10 (2009.01)

(52) U.S. Cl.
CPC .......... H04W 68/02 (2013.01); H04W 48/10 (2013.01)

(58) Field of Classification Search
CPC ... H04W 68/02; H04W 48/10; H04W 68/005; H04W 48/12; H04W 4/12
See application file for complete search history.

(56) References Cited

U.S. PATENT DOCUMENTS

2013/0208667 A1    8/2013 Merlin
2015/0065106 A1    3/2015 Catovic et al.
(Continued)

FOREIGN PATENT DOCUMENTS

CN    104919873 A    9/2015
CN    107787042 A    3/2018
(Continued)

OTHER PUBLICATIONS

"3rd Generation Partnership Project; Technical Specification Group Services and System Aspects; Study on system enablers for devices having multiple Universal Subscriber Identity Modules (USIM) (Release 17)", 3GPP Draft; sp-200693. ZIP 23761-100, 3rd Generation Partnership Project (3GPP). Mobile Competence Centre ; 650, Route Deslucioles ; F-06921 Sophia-Antipolis Cedex; France, Sep. 8, 2020 (Sep. 8, 2020),XP051932719, items [6.1], [6.3], 104 pages.
(Continued)

*Primary Examiner* — Diane D Mizrahi
(74) *Attorney, Agent, or Firm* — PERKINS COIE LLP (57) ABSTRACT

Provided are a paging indication method and apparatus, and a terminal device and a network device. The method includes that: a terminal device receives a paging message sent by a first network, the first network being to a network corresponding to a first communication card of the terminal device. The paging message carries at least one information unit, and each information unit in the at least one information unit is used for indicating at least one of the following kinds of information of a paged terminal device: a paging reason, a paging priority or slice information.

20 Claims, 3 Drawing Sheets

First network transmits a paging message to a terminal device, and the terminal device receives the paging message from the first network, the first network being a network corresponding to a first communication card of the terminal device; where the paging message carries at least one information unit, and each information unit of the at least one information unit is used to indicate at least one of the following information of a paged terminal device: paging cause, paging priority or slice information

201

(56) References Cited

U.S. PATENT DOCUMENTS

| | | | |
|---|---|---|---|
| 2015/0201397 | A1 | 7/2015 | Jeong et al. |
| 2017/0070973 | A1 | 3/2017 | Merlin |
| 2017/0150545 | A1 | 5/2017 | Ramkumar et al. |
| 2017/0251451 | A1 | 8/2017 | Jeong et al. |
| 2017/0325278 | A1 | 11/2017 | Ramkumar et al. |
| 2022/0046586 | A1* | 2/2022 | Dhanda ................. H04W 48/18 |
| 2023/0209503 | A1 | 6/2023 | Wang |

FOREIGN PATENT DOCUMENTS

| | | |
|---|---|---|
| CN | 110730445 A | 1/2020 |
| CN | 111836219 A | 10/2020 |
| EP | 4213552 A1 | 7/2023 |
| WO | 2013025636 A2 | 2/2013 |
| WO | 2018005419 A1 | 1/2018 |
| WO | 2020185949 A2 | 9/2020 |

OTHER PUBLICATIONS

Nokia et al: "KI#3: New solution: Notification on user plane of a master PLMN", 3GPP Draft; S2-2005018, 3rd Generation Partnership Project (3GPP), mobiloe Copetence Centre ; 650, Route Des Lucioles ; E-06921 Sophia-Antipolis Cedex; France vol. SA WG2, No. Online; 202008192020090213 Aug. 2020 (Aug. 13, 2020), XP051919913, the whole document, 5 pages.

Nokia et a: "Paging Reception for Musim", 3GPP Draft; R2-2007353, 3rd Generation Partnership Project (3GPP), Mobilecompetence Centre ; 650, Route Des Lucioles ; F-06921 Sophia-Antipolis Cedex; France vol. RAN WG2, No. Electronic; 20200817202008287 Aug. 2020 (Aug. 7, 2020), XP052360470, the whole document, 3 pages.

Supplementary European Search Report in the European application No. 20959261.7, mailed on Nov. 24, 2023, 12 pages.

International Search Report in the international application No. PCT/CN2020/125524, mailed on Jul. 30, 2021. 5 pages with English translation.

Written Opinion of the International Search Authority in the international application No. PCT/CN2020/125524, mailed on Jul. 30, 2021. 6 pages with English translation.

3rd Generation Partnership Project;Technical Specification Group Radio Access Network "Study on system enablers for devices having multiple Universal Subscriber Identity Modules (USIM) (Release 17)" 3GPP TR 23.761 V0.4.0 (Jun. 2020).(Clean). 79 pages.

3rd Generation Partnership Project;Technical Specification Group Radio Access Network"Study on system enablers for devices having multiple Universal Subscriber Identity Modules (USIM) (Release 17)"3GPP TR 23.761 V0.4.0 (Jun. 2020).(marked up). 86 pages.

Apple Inc. "Motivations for Paging with Service Indication". 3GPP TSG-RAN WG2 Meeting #112e R2-2009507 Electronic, Nov. 2, 2020-Nov. 13, 2020. section 1-2.

First Office Action of the Chinese application No. 202311405891.4, issued on Oct. 13, 2024. 13 pages with English translation.

* cited by examiner

FIG. 1

| First network transmits a paging message to a terminal device, and the terminal device receives the paging message from the first network, the first network being a network corresponding to a first communication card of the terminal device; where the paging message carries at least one information unit, and each information unit of the at least one information unit is used to indicate at least one of the following information of a paged terminal device: paging cause, paging priority or slice information | 201 |

PAGING INDICATION METHOD AND APPARATUS, AND TERMINAL DEVICE AND NETWORK DEVICE

CROSS REFERENCE TO RELATED APPLICATION

This is a continuation of International Patent Application No. PCT/CN2020/125524 filed on Oct. 30, 2020, the disclosure of which is hereby incorporated by reference in its entirety.

BACKGROUND

After receiving a paging message, a communication card of a terminal device will directly enter a connected state to receive service data. However, it is not necessary for the terminal device to respond to the paging message in some cases. For this reason, there is a need to indicate relevant information for triggering paging for the terminal device to determine whether the paging message should be responded. How to indicate the relevant information for triggering paging remains to be solved.

SUMMARY

The present disclosure relate to the technical field of mobile communication, and in particular to a method and an apparatus for paging indication, a terminal device and a network device.

In embodiments of the present disclosure, there is provided a method and an apparatus for paging indication, a terminal device and a network device.

The method for paging indication provided by the embodiments of the present disclosure includes that:

a terminal device receives a paging message from a first network, the first network being a network corresponding to a first communication card of the terminal device.

The paging message carries at least one information unit, and each information unit of the at least one information unit is used to indicate at least one of the following information of a paged terminal device: a paging cause, a paging priority or slice information.

The method for paging indication provided by the embodiments of the present disclosure includes that: a first network transmits a paging message to a terminal device, the first network being a network corresponding to a first communication card of the terminal device.

The paging message carries at least one information unit, and each information unit of the at least one information unit is used to indicate at least one of the following information of a paged terminal device: a paging cause, a paging priority or slice information.

The apparatus for paging indication provided by the embodiments of the present disclosure is applied to a terminal device and includes a receiving unit.

The receiving unit is configured to receive a paging message from a first network, the first network being a network corresponding to a first communication card of the terminal device.

The paging message carries at least one information unit, and each information unit of the at least one information unit is used to indicate at least one of the following information of a paged terminal device: a paging cause, a paging priority or slice information.

The apparatus for paging indication provided by the embodiments of the present disclosure is applied to a first network and includes a transmitting unit.

The transmitting unit is configured to transmit a paging message to a terminal device, the first network being a network corresponding to a first communication card of the terminal device.

The paging message carries at least one information unit, and each information unit of the at least one information unit is used to indicate at least one of the following information of a paged terminal device: a paging cause, a paging priority or slice information.

A terminal device provided by the embodiments of the present disclosure includes a processor and a memory. The memory is configured to store a computer program, and the processor is configured to call and execute the computer program stored in the memory to implement the above method for paging indication.

A network device provided by the embodiments of the present disclosure includes a processor and a memory. The memory is configured to store a computer program, and the processor is configured to call and execute the computer program stored in the memory to implement the above method for paging indication.

BRIEF DESCRIPTION OF THE DRAWINGS

The accompanying drawings illustrated herein are used to provide further understanding of the present disclosure and constitute a part of the present disclosure, and illustrative embodiments of the present disclosure and their description are used to explain the present disclosure instead of constituting improper limitation to the present disclosure. In the accompanying drawings.

DETAILED DESCRIPTION

The technical solution of the embodiments of the present disclosure will be described below in conjunction with the drawings in the embodiments of the present disclosure, and it will be apparent that the described embodiments are part of the embodiments of the present disclosure, but not all of them. Based on the embodiments in the present disclosure, all other embodiments obtained by those of ordinary skill in the art without making creative efforts fall within the scope of protection of the present disclosure.

The technical solution of the embodiments of the present disclosure may be applied to various communication systems, such as long term evolution (LTE) system, LTE frequency division duplex (FDD) system, LTE time division duplex (TDD) system, 5G communication system or future communication system, etc.

Figure 1:
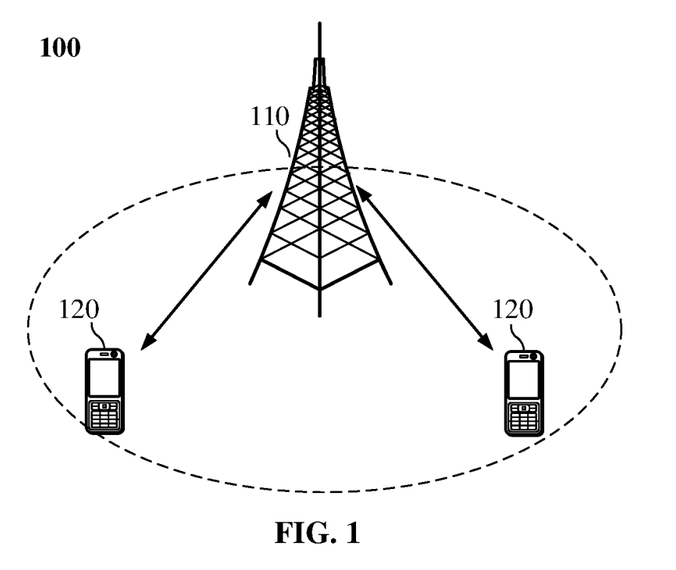
FIG. 1 is a schematic diagram of a communication system architecture provided by an embodiment of the present disclosure.

Exemplary, a communication system 100 applied in the embodiments of the present disclosure is illustrated in FIG. 1. The communication system 100 may include a network device 110, which may be a device that communicates with a terminal 120 (or referred to as a communication terminal or a terminal). The network device 110 may provide communication coverage for a particular geographic area and may communicate with terminals located within the coverage area. Optionally, the network device 110 may be an evolution NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network-side device in a 5G network or a network device in a future communication system, etc.

The communication system 100 also includes at least one terminal 120 located within the coverage area of the network device 110. "Terminal" as used herein includes, but is not limited to, a connection via a wired line, such as via a public switched telephone network (PSTN), a digital subscriber line (DSL), a digital cable, a direct cable connection; and/or another data connection/network; and/or via a wireless interface such as a cellular network, a wireless local area network (WLAN), a digital television network such as a DVB-H network, a satellite network, an AM-FM broadcast transmitter; and/or a device of another terminal arranged to receive/transmit a communication signal; and/or Internet of Things (IoT) devices. A terminal arranged to communicate through a wireless interface may be referred to as "a wireless communication terminal", "a wireless terminal", or "a mobile terminal". Examples of mobile terminals include but are not limited to satellite or cellular phones; personal communications system (PCS) terminals that may combine cellular radio telephones with data processing, facsimile, and data communication capabilities; PDA which may include radio telephones, pagers, Internet/Intranet access, Web browsers, notebooks, calendars, and/or global positioning system (GPS) receivers; and conventional laptop and/or handheld receivers or other electronic devices including radio telephone transceivers. The terminal may refer to an access terminal, user equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol (SIP) telephone, wireless local loop (WLL) station, a personal digital assistant (PDA), a handheld device with wireless communication function, a computing device or other processing device connected to wireless modem, an in-vehicle device, a wearable device, a terminal in 5G network or a terminal in the future evolved public land mobile network (PLMN), etc.

Optionally, device to device (D2D) communication may be performed between the terminals 120.

Optionally, the 5G communication system or 5G network may also be referred to as a new radio (NR) system or an NR network.

FIG. 1 exemplarily illustrates a network device and two terminals. Optionally, the communication system 100 may include multiple network devices and other numbers of terminals may be included within the coverage of each network device, which is not limited by the embodiments of the present disclosure.

Optionally, the communication system 100 may also include other network entities such as network controllers, mobility management entities and the like, which are not limited by the embodiments of the present disclosure.

It should be understood that a device having a communication function in a network/system in the embodiments of the present disclosure may be referred to as a communication device. Taking the communication system 100 illustrated in FIG. 1 as an example, the communication device may include a network device 110 and terminals 120 having a communication function, the network device 110 and the terminals 120 may be specific devices described above and will not be described here. The communication device may also include other devices in the communication system 100 such as network controllers, mobility management entities and other network entities, which are not limited in the embodiments of the present disclosure.

It should be understood that the terms "system" and "network" of the present disclosure are often used interchangeably herein. In the present disclosure, the term "and/or" is used to describe an association relationship of associated objects, and for example indicates that there may be three relationships between related objects. For example, A and/or B may mean that the following three situations: Only A exists, both A and B exist, and only B exists. In addition, the character "/" in the present disclosure generally indicates an "or" relationship between the associated objects.

In order to facilitate understanding of the technical solution of the embodiments of the present disclosure, the technical solution related to the embodiments of the present disclosure is described below.

With people's pursuit of speed, latency, high-speed mobility, energy efficiency as well as the diversity and complexity of business in future life, 3rd generation partnership project (3GPP) international standards organization began to develop 5G. The main application scenarios of 5G include enhanced mobile broadband (eMBB), ultra-reliable low-latency communications (URLLC) and massive machine-type communications (mMTC).

On the one hand, eMBB still aims at acquisition of multimedia content, services and data for users, and its demand is growing rapidly. On the other hand, eMBB may be deployed in different scenarios, such as indoor, urban, rural, whose capabilities and requirements are quite different, and thus it cannot be generalized and must be analyzed in detail in combination with specific deployment scenarios. Typical applications of URLLC include: industrial automation, power automation, telemedicine operation (surgery), traffic safety guarantee and so on. The typical characteristics of mMTC include: high connection density, small data volume, delay-insensitive services, low cost of modules and long service life.

RRC State

In order to reduce the radio signaling and quickly restore wireless connection and data service, a new radio resource control (RRC) state, that is, RRC inactive (RRC INACTIVE) state is defined in 5G. This state is different from the RRC idle (RRC IDLE) state and the RRC active (RRC ACTIVE) state.

1) RRC IDLE state (abbreviated as idle state): in this state, mobility is cell selection and cell reselection based on a terminal device, paging is initiated by a core network (CN), and paging area is configured by CN.

There is no terminal device context and no RRC connection on the base station side.

2) RRC CONNECTED state (abbreviated as connected state): in this state, RRC connection exists, and the terminal device context exists on base station side and terminal device side. The network side knows that the location of the terminal device is at a specific cell level. Mobility is the mobility controlled by the network side. Unicast data may be transmitted between the terminal device and the base station.

3) RRC INACTIVE state (abbreviated as inactive state): in this state, mobility is cell selection and cell reselection based on the terminal device, connection between CN and NR exists, the terminal device context exists on a certain base station, paging is triggered by RAN, paging area based on RAN is managed by RAN, and network side knows that the location of the terminal device is based on paging area level of RAN. It is not necessary to notify the network side when the terminal device moves within the radio access network notification area (RNA) configured by the RAN, but it is necessary to notify the network side when the terminal device moves out of the RNA.

Network Slicing

In order to meet the requirements of vertical industries for delay, mobility, reliability, position accuracy and so on, RAN needs to enhance how to support vertical services in the access network. A method is to provide lower latency, more targeted, greater flexibility and higher scalability for multiple services with different requirements based on network slicing (also abbreviated as slicing). More specifically, network slicing enables application providers to participate in the design, deployment, and operation of customized RAN to better support the services of the application providers.

The network slicing of Rel-15 only involves the core network side. Specifically, the terminal device reports its slicing requirement (i.e. the slice information required by the terminal device), and the network selects the appropriate AMF according to the slicing requirement reported by the terminal device, so as to establish the service session between the terminal device and the network.

The network, after receiving MSG5, may only know the slicing requirement of the terminal device. However, the slicing requirement of the terminal device may not be a slicing supported by the base station, or a slicing supported by the base station but it is overloaded. At this time, the network may only send an RRC release message to the terminal device after MSG5, so that the terminal device may re-select the appropriate cell.

Dual Card Dual Standby/Dual Network Dual Standby

Dual card dual standby mobile phone means that a mobile phone may hold two communication cards at the same time, and both communication cards are in standby state. Dual card dual standby generally refers to dual card dual standby in the same network system, such as dual card dual standby in GSM network, dual card dual standby in CDMA network and dual card dual standby in PHS network.

Dual network and dual standby means that two communication cards of different networks may be inserted into a mobile phone at the same time, and the two communication cards are turned on at the same time, so that users may dial, answer, send and receive short messages at will without switching networks.

At present, mobile phones generally do not support pure dual UL/DL (also referred to as dual network communication). Dual UL/DL refers to that a mobile phone performs uplink transmission and downlink reception of data on two networks through two communication cards simultaneously. Generally speaking, most mobile phones only support single UL/DL or single UL/dual DL, which means that mobile phones may only execute the service on one communication card at a certain time. However, the realization of dual network communication is a development trend of mobile phones in the future. In 5G, for two communication cards of mobile phones supporting dual card dual standby or dual network dual standby, one of the communication cards may reside in LTE cell and the other communication card may reside in NR cell. Optionally, both communication cards reside in the NR cell. On the other hand, the two communication cards may be communication cards of the same operator or communication cards of different operators.

After receiving a paging message, a communication card of the terminal device will directly enter the connected state to receive service data. However, it is not necessary for the terminal device to respond to the paging message in some cases. For this reason, there is a need to indicate relevant information for triggering paging for the terminal device to determine whether the paging message should be responded. How to indicate the relevant information for triggering paging remains to be solved. Therefore, the following technical solution of the embodiments of the present disclosure is proposed.

It should be noted that the "terminal device" in the embodiments of the present disclosure may be a mobile phone, a tablet computer, a wearable device, etc. The terminal device may have one communication card (i.e., applied to a single card scene), and the terminal device may also have multiple communication cards (i.e., applied to a multi-card communication scene), for example, the terminal device has two communication cards or three communication cards, etc. The following embodiments are described by taking the first communication card of the terminal device as an example and no limits are made thereto. The scheme of two or more communication cards is also applicable to the technical solution of the embodiments of the present disclosure.

In the embodiments of the present disclosure, the terminal device has at least a first communication card. For multi-card scene, the terminal device may also have a second communication card. The network corresponding to the first communication card is a first network, and the network corresponding to the second communication card is a second network. The first communication card is registered on the first network, and the second communication card is registered on the second network.

It should be noted that the embodiments of the present disclosure does not limit the types of the first communication card and the second communication card. For example, both the first communication card and the second communication card are subscriber identity module (SIM) cards. For example, both the first communication card and the second communication card are universal subscriber identity module (USIM) cards. For example, the first communication card is an SIM card and the second communication card is a USIM card. For example, the first communication card is a USIM card and the second communication card is an SIM card. On the other hand, the embodiments of the present disclosure do not limit the network types supported by the first communication card and the second communication card, for example, the first communication card supports LTE network (i.e. the first base station corresponding to the first communication card is an LTE base station), and the second communication card supports NR network (i.e. the second base station corresponding to the second communication card is an NR base station). For example, both the first communication card and the second communication card support an NR network (i.e. the first base station corresponding to the first communication card and the second base station corresponding to the second communication card are both NR base stations). In another aspect, the embodiments of the present disclosure do not limit the operators to which the first communication card and the second communication card belong, for example, the first communication card and the second communication card may belong to the same operator or may belong to different operators.

It should be noted that the communication between the terminal device and the first network is realized through the first communication card, and the communication between the terminal device and the second network is realized through the second communication card. For example, there are two USIM cards in the terminal device, namely USIM-A card and USIM-B card. The terminal device may communicate with the first network through the USIM-A card, and the terminal device may communicate with the second network through the USIM-B card.

Figure 2:
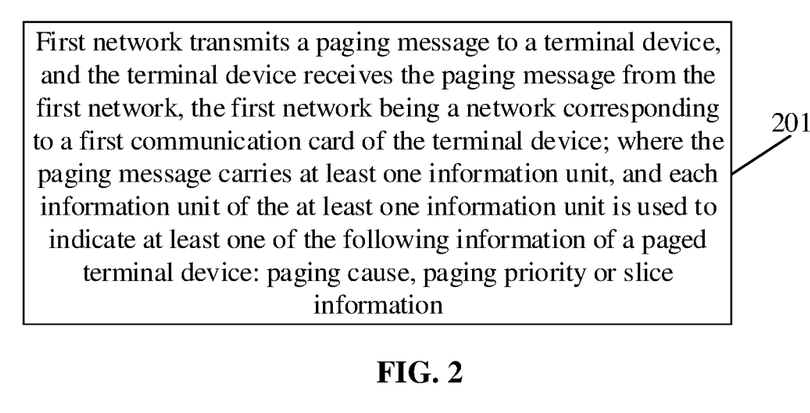
FIG. 2 is a schematic flow chart of a method for paging indication provided by an embodiment of the present disclosure.

FIG. 2 is a schematic flow chart of a method for paging indication provided by an embodiment of the present disclosure. As illustrated in FIG. 2, the method for paging indication includes the following operation.

At block 201, a first network transmits a paging message to a terminal device, and the terminal device receives the paging message from the first network, the first network being a network corresponding to a first communication card of the terminal device. The paging message carries at least one information unit, and each information unit of the at least one information unit is used to indicate at least one of the following information of a paged terminal device: a paging cause, a paging priority or slice information.

In some embodiments of the present disclosure, the first communication card of the terminal device is in an idle state or an inactive state. In this case, the terminal device receives the paging message from the first network corresponding to the first communication card, and the paging message is used for paging the first communication card.

In some embodiments of the present disclosure, the paging message carries at least one information unit, and each information unit of the at least one information unit is used to indicate at least one of the following information of a paged terminal device: a paging cause, a paging priority or slice information.

In an optional manner, the paging cause is a service type that triggers paging.

In an optional manner, the paging priority is a service priority that triggers paging.

In an optional manner, the slice information includes at least one of: slice identification, slice type or slice indication information; and the slice indication information have a correspondence with the slice identification. Further, optionally, the correspondence between the slice indication information and the slice identifications is agreed by a protocol, or configured by system broadcast information, or configured by a radio resource control (RRC) signaling, or configured by a non-access layer (NAS) signaling. Here, each slice has a corresponding slice identification, which may also be called slice index.

In an example, the slice information includes first slice indication information, which has a correspondence with a first slice identification, and the terminal device may determine the first slice identification through the first slice indication information and the correspondence between the first slice indication information and the first slice identification.

In some embodiments of the present disclosure, the paging message carries at least one information unit, which may be realized in the following manners: the paging message carries a first bitmap, and every N bits in the first bitmap have a correspondence with one information unit, N being a positive integer.

In an optional manner, the paging message further carries first indication information, and the first indication information is used to indicate a value of N. Here, the first indication information is used to indicate how many bits in the first bitmap constitute one information unit. The size of an information unit (i.e. the number of bits occupied by an information unit) is configurable, or in other words, the size of an information unit is variable.

In an optional manner, in response to that the paging message does not carry first indication information, a value of N is a default value. For example, the default value of N is 1, or in other words, the size of an information unit is 1 bit.

In the above solution, the size of an information unit may also be called unitSize.

In some embodiments of the present disclosure, a value of the N bits is used to indicate information content indicated by the information unit corresponding to the N bits. Further, optionally, a correspondence between the value of the N bits and the information content indicated by the N bits is agreed by a protocol or is configured by system broadcast information.

In the above solution, the first bitmap may also be called pagingCauseBitmap. The size of the first bitmap is variable, and the size of the first bitmap varies with the number of paging records in a first paging record list PagingRecordList. Specifically, the first bitmap includes M bits, a value of the M is associated with the number of paging records contained in the first paging record list, M being a positive integer. For example, the value of the M is the number of paging records contained in the first paging record list multiplied by N.

In an example, under different unitSizes agreed by protocol or configured by system broadcast information, different values of N bits occupied by the information unit represent different meanings.

For example, if unitSize=2 (i.e., N=2), the information unit of 2 bits indicates four kinds of information contents. An example is given below:
- 00: its indicated information content includes at least one of the following: voice service type, priority 1, slice information 1 (e.g. slice identification 1);
- 01: its indicated information content includes at least one of the following: video service type, priority 2, slice information 2 (e.g. slice identification 2);
- 10: its indicated information content includes at least one of the following: stream service type, priority 3, slice information 3 (e.g. slice identification 3);
- 11: its indicated information content includes at least one of the following: other service type, priority 4, slice information 4 (e.g. slice identification 4).

For example, if unitSize=1 (i.e., N=1), the information unit of 1 bit indicates two kinds of information contents. An example is given below:
- 00: its indicated information content includes at least one of the following: voice service type, high priority, slice information 1 (e.g. slice identification 1);

01: its indicated information content includes at least one of the following: other service type, low priority, slice information 2 (e.g. slice identification 2).

In some embodiments of the present disclosure, the first paging record list includes P paging records, and P is a positive integer. Every N bits in the first bitmap in an order from low bit to high bit has a correspondence with one information unit, the first bitmap having a correspondence with P information units, and the P information units having a one-to-one correspondence with the P paging records.

If the first paging record list includes five paging records, that is, P=5, then the first bit map (i.e., pagingCauseBitmap) includes 10 bits. Every two bits represent an information unit, and there are five information units in total. Every two bits in the pagingCauseBitmap in an order from low bit to high bit correspond to one information unit, and the five information units correspond to the first paging record, the second paging record, the third paging record, the fourth paging record and the five paging record in the first paging record list one by one.

Table 1 illustrates the information content of the paging-CauseBitmap. It should be noted that the size of the pagingCauseBitmap in Table 1 ranges from 1 to 32, and the values 1 to 32 here are only illustrative.

TABLE 1

```
Paging ::=                      SEQUENCE {
    pagingRecordList                PagingRecordList
    OPTIONAL, -- Need N
    lateNonCriticalExtension        OCTET STRING
    OPTIONAL,
    nonCriticalExtension            SEQUENCE{ Paging-v17xy}
    OPTIONAL
}
PagingRecordList ::=            SEQUENCE (SIZE(1..maxNrofPageRec)) OF PagingRecord
PagingRecord ::=                SEQUENCE {
    ue-Identity                     PagingUE-Identity,
    accessType                      ENUMERATED {non3GPP}    OPTIONAL,  -- Need N
    ...
}
PagingUE-Identity ::=           CHOICE {
    ng-5G-S-TMSI                    NG-5G-S-TMSI,
    fullI-RNTI                      I-RNTI-Value,
    ...
}
Paging-v17xy ::=                SEQUENCE {
    pagingCauseBitmap               BIT STRING (SIZE (1..32))   OPTIONAL, -- Need N
    unitsize                        ENUMERATED {one, two, three, four}   OPTIONAL, -- Need N
    nonCriticalExtension            SEQUENCE{ }                          OPTIONAL
}
```

In some embodiments of the present disclosure, the location of the slice information may be in the following two manners.

First manner: The slice information indicated by the information unit is carried in a paging record in a first paging record list, and the paging record corresponds to the information unit. Each paging record in the first paging record list further carries at least one of the following: a terminal device identification or an access type.

Specifically, taking the slice information as the slice identification (id) as an example, for the slice id, the slice id indicated by each information unit is included in a paging record corresponding to the information unit. With reference to Table 2 below, single network slice selection assistance information (S-NSSAI) represents the slice id.

TABLE 2

```
Paging ::=                      SEQUENCE {
    pagingRecordList                PagingRecordList
    OPTIONAL, -- Need N
    lateNonCriticalExtension        OCTET STRING
    OPTIONAL,
    nonCriticalExtension            SEQUENCE{ }
    OPTIONAL
}
PagingRecordList ::=            SEQUENCE (SIZE(1..maxNrofPageRec)) OF PagingRecord
PagingRecord ::=                SEQUENCE {
    ue-Identity                     PagingUE-Identity,
    accessType                      ENUMERATED {non3GPP}   OPTIONAL,  -- Need N
    ...'
    [[s-NSSAI ::=                   S-NSSAI     PTIONAL,  -- Need N]]
}
PagingUE-Identity ::=           CHOICE {
```

TABLE 2-continued

```
  ng-5G-S-TMSI         NG-5G-S-TMSI,
  fulll-RNTI           I-RNTI-Value,
  ...
}
S-NSSAI ::=            CHOICE{
  sst                    BIT STRING (SIZE (8)),
  sst-SD                 BIT STRING (SIZE (32))
}
```

Second manner: The slice information indicated by the information unit is carried in a paging record corresponding to the information unit in a second paging record list, paging records in the second paging record list have a one-to-one correspondence to paging records in the first paging record list, and each paging record in the first paging record list carries at least one of the following: a terminal device identification or an access type.

Specifically, taking the slice information as slice identification (slice id) as an example, for the slice id, a new Pagingrecordlist (i.e., a second paging record list) is configured, and each paging record in the new Pagingrecordlist carries a slice id. There is a one-to-one correspondence between the paging records in the new Pagingrecordlist and the paging records in the previously configured Pagingrecordlist carrying the UE id, and each paging record in the new Pagingrecordlist respectively indicates the slice identification of paging for each terminal device. Refer to Table 3 below, S-NSSAI represents the slice identification.

In an optional manner of the present disclosure, the first network transmits system broadcast information, and the terminal device receives the system broadcast information from the first network, the system broadcast information carrying at least one of second indication information or third indication information. The second indication information is used to indicate whether the first network supports transmission of the information unit or the paging cause; and the third indication information is used to indicate whether the first network supports reception of leaving indication information or busy indication information from the terminal device.

Further, after receiving the second indication information, the terminal device has the following processing manners.

In response to that the second indication information indicates that the first network supports transmission of the information unit or the paging cause, after receiving the paging message, the terminal device determines whether to respond to the paging message through the information unit

TABLE 3

```
Paging ::=                    SEQUENCE {
  pagingRecordList              PagingRecordList
OPTIONAL, -- Need N
  lateNonCriticalExtension      OCTET STRING
OPTIONAL,
  nonCriticalExtension          SEQUENCE{ Paging-v17xy}
OPTIONAL
}
PagingRecordList ::=          SEQUENCE (SIZE(1..maxNrofPageRec)) OF PagingRecord
PagingRecord ::=              SEQUENCE {
  ue-Identity                   PagingUE-Identity,
  accessType                    ENUMERATED {non3GPP}   OPTIONAL,   -- Need N
  ...
}
PagingUE-Identity ::=         CHOICE {
  ng-5G-S-TMSI                  NG-5G-S-TMSI,
  fulll-RNTI                    I-RNTI-Value,
  ...
}
Paging-v17xy ::=              SEQUENCE {
  pagingRecordList-v17xy         PagingRecordList-v17xy
OPTIONAL, -- Need N
  nonCriticalExtension          SEQUENCE{ Paging-v17xy}
OPTIONAL
}
PagingRecordList-v17xy ::=    SEQUENCE (SIZE(1..maxNrofPageRec)) OF
PagingRecord-v17xy
PagingRecord-v17xy ::=        SEQUENCE {
  s-NSSAI ::=                   S-NSSAI,
  ...
}
```

In the technical solution of the embodiments of the present disclosure, at least one of the paging cause, the paging priority and the slice information is indicated by a bitmap, and the length of the bitmap.

It should be noted that the technical solution of the embodiments of the present disclosure may be, but is not limited to, applied in a dual card scenario.

or the paging cause in the paging message. For example, if the service triggering paging belongs to service type 1, the paging message is responded. If the service triggering paging belongs to service type 2, the paging message will not be responded. For example, if the service triggering paging is a high priority service, the paging message is responded. If the service triggering paging is a low priority service, the paging message will not be responded.

In response to that the second indication information indicates that the first network does not support transmission of the information unit or the paging cause, after receiving the paging message, the terminal device accesses the first network and determines whether to remain in the first network or leave the first network.

Further, after receiving the third indication information, the terminal device has the following processing manners.

In response to that the third indication information indicates that the first network supports reception of the leaving indication information or the busy indication information from the terminal device, the terminal device is able to transmit a message carrying the leaving indication information or the busy indication information.

With the above technical solution, the first network carries at least one information unit in a paging message, each information unit is used to indicate at least one of the following information of a paged terminal device: a paging cause, a paging priority or slice information, so that the terminal device can determine whether to respond to the paging message according to the content indicated by the information unit, thereby improving paging efficiency.

Figure 3:
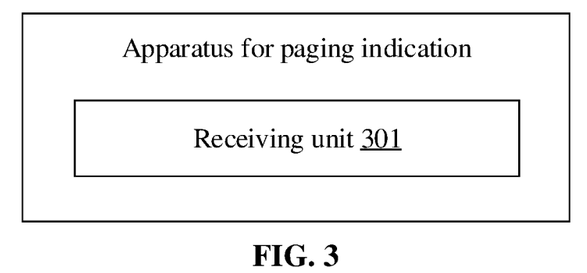
FIG. 3 is a first structural composition diagram of an apparatus for paging indication provided by an embodiment of the present disclosure.

FIG. 3 is a first structural composition diagram of an apparatus for paging indication provided by an embodiment of the present disclosure, and the apparatus is applied to a terminal device. As illustrated in FIG. 3, the apparatus for paging indication includes a receiving unit 301.

The receiving unit 301 is configured to receive a paging message from a first network, the first network being a network corresponding to a first communication card of the terminal device.

The paging message carries at least one information unit, and each information unit of the at least one information unit is used to indicate at least one of the following information of a paged terminal device: a paging cause, a paging priority or slice information.

In an optional manner, the paging message carries a first bitmap, and every N bits in the first bitmap have a correspondence with one information unit, N being a positive integer.

In an optional manner, the paging message further carries first indication information, and the first indication information is used to indicate a value of N.

In an optional manner, in response to that the paging message does not carry first indication information, a value of N is a default value, the first indication information being used to indicate the value of N.

In an optional manner, a value of the N bits is used to indicate information content indicated by the information unit corresponding to the N bits.

In an optional manner, a correspondence between the value of the N bits and the information content indicated by the N bits is agreed by a protocol or is configured by system broadcast information.

In an optional manner, the first bitmap includes M bits, a value of the M is associated with a number of paging records contained in a first paging record list, M being a positive integer.

In an optional manner, the value of the M is the number of paging records contained in the first paging record list multiplied by N.

In an optional manner, the first paging record list includes P paging records, P being a positive integer; and every N bits in the first bitmap in an order from low bit to high bit have a correspondence with one information unit, the first bitmap having a correspondence with P information units, and the P information units having a one-to-one correspondence with the P paging records.

In an optional manner, the slice information indicated by the information unit is carried in a paging record corresponding to the information unit in a first paging record list, and each paging record in the first paging record list further carries at least one of the following: a terminal device identification or an access type.

In an optional manner, the slice information indicated by the information unit is carried in a paging record corresponding to the information unit in a second paging record list, paging records in the second paging record list have a one-to-one correspondence to paging records in the first paging record list, and each paging record in the first paging record list carries at least one of the following: a terminal device identification or an access type.

In an optional manner, the slice information includes at least one of: slice identification, slice type or slice indication information; and the slice indication information have a correspondence with the slice identification.

In an optional manner, the correspondence between the slice indication information and the slice identification is agreed by a protocol, or configured by system broadcast information, or configured by a radio resource control (RRC) signaling, or configured by a non-access layer (NAS) signaling.

In an optional manner, the receiving unit 301 is further configured to receive system broadcast information from the first network, the system broadcast information carrying at least one of second indication information or third indication information. The second indication information is used to indicate whether the first network supports transmission of the information unit or the paging cause; and the third indication information is used to indicate whether the first network supports reception of leaving indication information or busy indication information from the terminal device.

In an optional manner, the apparatus further includes a determining unit.

The determining unit (not illustrated in FIG. 3) is configured to in response to that the second indication information indicates that the first network supports transmission of the information unit or the paging cause, after receiving the paging message, determine whether to respond to the paging message through the information unit or the paging cause in the paging message; in response to that the second indication information indicates that the first network does not support transmission the information unit or the paging cause, after receiving the paging message, access the first network and determine whether to remain in the first network or leave the first network.

In an optional manner, in response to that the third indication information indicates that the first network supports reception of the leaving indication information or the busy indication information from the terminal device, the terminal device is able to transmit a message carrying the leaving indication information or the busy indication information.

It will be understood by those skilled in the art that the above description of the apparatus for paging indication of the embodiments of the present disclosure may be understood with reference to the description of the method for paging indication of the embodiments of the present disclosure.

Figure 4:
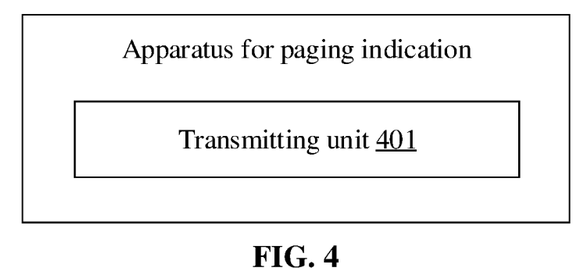
FIG. 4 is a second structural composition diagram of an apparatus for paging indication provided by an embodiment of the present disclosure.

FIG. 4 is a second structural composition diagram of an apparatus for paging indication provided by an embodiment of the present disclosure, and the apparatus is applied to a first network. As illustrated in FIG. 4, the apparatus for paging indication includes a transmitting unit 401.

The transmitting unit 401 is configured to transmit a paging message to a terminal device, the first network being a network corresponding to a first communication card of the terminal device.

The paging message carries at least one information unit, and each information unit of the at least one information unit is used to indicate at least one of the following information of a paged terminal device: a paging cause, a paging priority or slice information.

In an optional manner, the paging message carries a first bitmap, and every N bits in the first bitmap have a correspondence with one information unit, N being a positive integer.

In an optional manner, the paging message further carries first indication information, and the first indication information is used to indicate a value of N.

In an optional manner, in response to that the paging message does not carry first indication information, a value of N is a default value, the first indication information being used to indicate the value of N.

In an optional manner, a value of the N bits is used to indicate information content indicated by the information unit corresponding to the N bits.

In an optional manner, a correspondence between the value of the N bits and the information content indicated by the N bits is agreed by a protocol or is configured by system broadcast information.

In an optional manner, the first bitmap includes M bits, a value of the M is associated with a number of paging records contained in a first paging record list, M being a positive integer.

In an optional manner, the value of the M is the number of paging records contained in the first paging record list multiplied by N.

In an optional manner, the first paging record list includes P paging records, P being a positive integer; and every N bits in the first bitmap in an order from low bit to high bit have a correspondence with one information unit, the first bitmap having a correspondence with P information units, and the P information units having a one-to-one correspondence with the P paging records.

In an optional manner, the slice information indicated by the information unit is carried in a paging record corresponding to the information unit in a first paging record list, and each paging record in the first paging record list further carries at least one of the following: a terminal device identification or an access type.

In an optional manner, the slice information indicated by the information unit is carried in a paging record corresponding to the information unit in a second paging record list, paging records in the second paging record list have a one-to-one correspondence to paging records in the first paging record list, and each paging record in the first paging record list carries at least one of the following: a terminal device identification or an access type.

In an optional manner, the slice information includes at least one of: slice identification, slice type or slice indication information; and the slice indication information have a correspondence with the slice identification.

In an optional manner, the correspondence between the slice indication information and the slice identification is agreed by a protocol, or configured by system broadcast information, or configured by a radio resource control (RRC) signaling, or configured by a non-access layer (NAS) signaling.

In an optional manner, the transmitting unit 401 is further configured to transmit system broadcast information, the system broadcast information carrying at least one of second indication information or third indication information. The second indication information is used to indicate whether the first network supports transmission of the information unit or the paging cause; and the third indication information is used to indicate whether the first network supports reception of leaving indication information or busy indication information from the terminal device.

It will be understood by those skilled in the art that the above description of the apparatus for paging indication of the embodiment of the present disclosure may be understood with reference to the description of the method for paging indication of the embodiments of the present disclosure.

Figure 5:
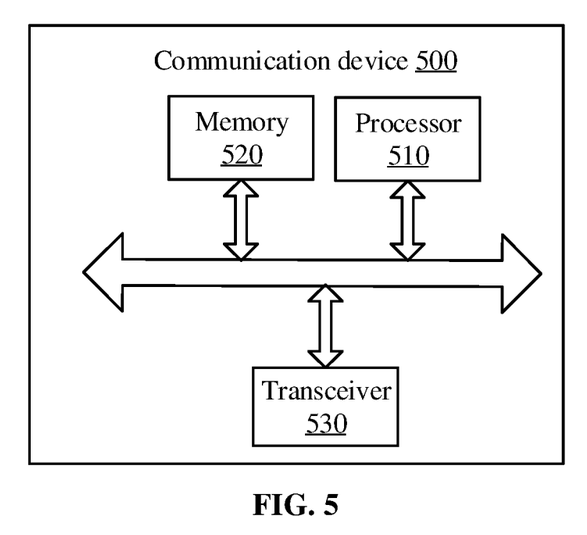
FIG. 5 is a schematic structural diagram of a communication device provided by an embodiment of the present disclosure.

FIG. 5 is a schematic structural diagram of a communication device 500 provided by an embodiment of the present disclosure. The communication device may be a terminal device or a network device (such as a base station used to implement the first network). The communication device 500 illustrated in FIG. 5 includes a processor 510 that may call and execute a computer program from memory to implement the method in the embodiments of the present disclosure.

Optionally, as illustrated in FIG. 5, the communication device 500 may also include a memory 520. The processor 510 may call and execute a computer program from memory 520 to implement the method in the embodiments of the present disclosure.

The memory 520 may be a separate device independent of the processor 510 or may be integrated in the processor 510.

Optionally, as illustrated in FIG. 5, the communication device 500 may also include a transceiver 530. The processor 510 may control the transceiver 530 to communicate with other devices, and in particular may send information or data to other devices, or receive information or data sent by other devices.

The transceiver 530 may include a transmitter and a receiver. The transceiver 530 may further include antennas. The number of antennas may be one or more.

Optionally, the communication device 500 may be specifically the network device of the embodiments of the present disclosure, and the communication device 500 may implement corresponding processes implemented by the network device in the respective methods of the embodiments of the present disclosure, which will not be repeated here for the sake of brevity.

Optionally, the communication device 500 may be specifically the mobile terminal/terminal device of the embodiments of the present disclosure, and the communication device 500 may implement corresponding processes implemented by the mobile terminal/terminal device in the respective methods of the embodiments of the present disclosure, which will not be repeated here for the sake of brevity.

Figure 6:
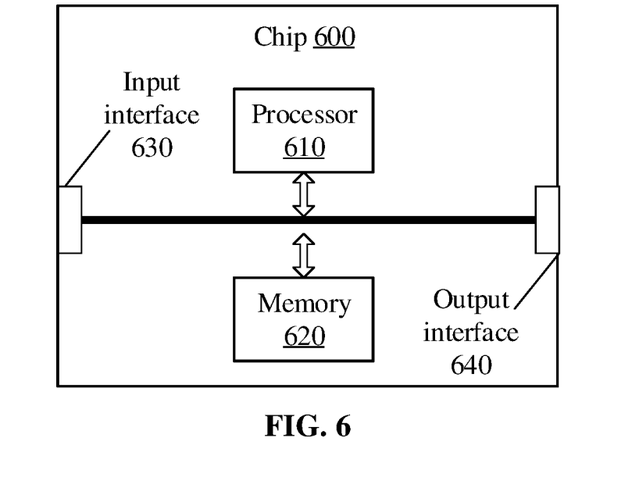
FIG. 6 is a schematic diagram of a chip according to an embodiment of the present disclosure.

FIG. 6 is a schematic diagram of a chip according to an embodiment of the present disclosure. A chip 600 illustrated in FIG. 6 includes a processor 610 that may call and execute a computer program from memory to implement the method in the embodiments of the present disclosure.

Optionally, as illustrated in FIG. 6, the chip 600 may also include a memory 620. The processor 610 that may call and execute a computer program from memory 620 to implement a method in the embodiments of the present disclosure.

The memory 620 may be a separate device independent of the processor 610 or may be integrated in the processor 610.

Optionally, the chip 600 may also include an input interface 630. The processor 610 may control the input interface

630 to communicate with other devices or chips, and in particular may obtain information or data sent by other devices or chips.

Optionally, the chip 600 may also include an output interface 640. The processor 610 may control the output interface 640 to communicate with other devices or chips, and in particular may output information or data to other devices or chips.

Optionally, the chip may applied to the network device of the embodiments of the present disclosure, and the chip may implement corresponding processes implemented by the network device in the respective methods of the embodiments of the present disclosure, which will not be repeated here for the sake of brevity.

Optionally, the chip may applied to the mobile terminal/terminal device of the embodiment of the present disclosure, and the chip may implement corresponding processes implemented by the mobile terminal/terminal device in the respective methods of the embodiments of the present disclosure, which will not be repeated here for the sake of brevity.

It should be understood that the chip referred to in embodiments of the present disclosure may also be referred to as a system-level chip, a system chip, a chip system or a system-on-chip or the like.

Figure 7:
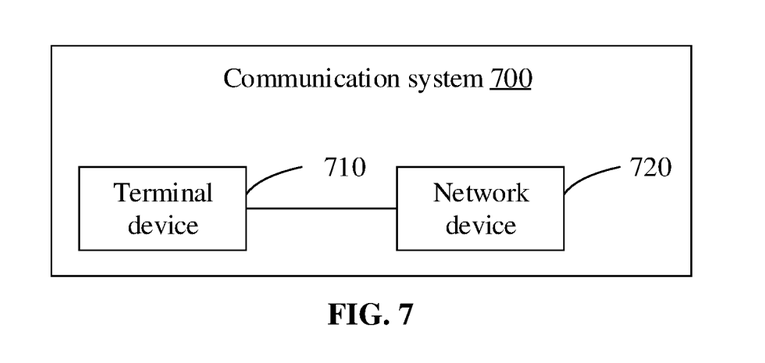
FIG. 7 is a schematic block diagram of a communication system provided by an embodiment of the present disclosure.

FIG. 7 is a schematic block diagram of a communication system 700 provided by an embodiment of the present disclosure. As illustrated in FIG. 7, the communication system 700 includes a terminal device 710 and a network device 720.

The terminal device 710 may be configured to implement corresponding functions implemented by the terminal device in the above method, and the network device 720 may be configured to implement corresponding functions implemented by the network device in the above method, which will not be repeated here for the sake of brevity.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in embodiments of the present disclosure. The general purpose processor may be a microprocessor or any conventional processor. The operations of the method disclosed in the embodiments of the present disclosure may be directly embodied as the completion of the execution of the hardware decoding processor or the completion of the combined execution of the hardware and software modules in the decoding processor. The software module may be located in a random access memory, a flash memory, a read-only memory, a programmable read-only memory or an electrically erasable programmable memory, a register and other mature storage media in the art. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and a non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory of the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, configured to store a computer program.

Optionally, the computer-readable storage medium may applied to the network device of the embodiments of the present disclosure, and the computer program causes a computer to implement corresponding processes implemented by the network device in the respective methods of the embodiments of the present disclosure, which will not be repeated here for the sake of brevity.

Optionally, the computer-readable storage medium may applied to the mobile terminal/terminal device of the embodiments of the present disclosure, and the computer program causes a computer to implement corresponding processes implemented by the mobile terminal/terminal device in the respective methods of the embodiments of the present disclosure, which will not be repeated here for the sake of brevity.

In an embodiment of the present disclosure, there is further provided a computer program product, which includes computer program instructions.

Optionally, the computer program product may applied to the network device of the embodiment of the present disclosure, and the computer program instructions cause a computer to implement corresponding processes implemented by the network device in the respective methods of the embodiments of the present disclosure, which will not be repeated here for the sake of brevity.

Optionally, the computer program product may applied to the mobile terminal/terminal device of the embodiments of the present disclosure, and the computer program instructions causes a computer to implement corresponding processes implemented by the mobile terminal/terminal device in the respective methods of the embodiments of the present disclosure, which will not be repeated here for the sake of brevity.

In an embodiment of the present disclosure, there is further provided a computer program.

Optionally, the computer program may applied to the network device of the embodiments of the present disclosure, when running on the computer, the computer program causes a computer to implement corresponding processes implemented by the network device in the respective methods of the embodiments of the present disclosure, which will not be repeated here for the sake of brevity.

Optionally, the computer program may applied to the mobile terminal/terminal device of the embodiments of the present disclosure, the computer program, when running on the computer, causes a computer to implement corresponding processes implemented by the mobile terminal/terminal device in the respective methods of the embodiments of the present disclosure, which will not be repeated here for the sake of brevity.

Those of ordinary skill in the art may realize that the various example units and algorithm steps described in connection with the embodiments disclosed herein may be implemented in electronic hardware or a combination of computer software and electronic hardware. Whether these functions are performed in hardware or software depends on the specific application and design constraints of the technical solution. Professionals may use different methods for each particular application to implement the described functionality but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other manners. For example, the above-described embodiments of the apparatus is only schematic, for example, the division of the unit is only a logical function division, and in practice, there may be another division mode, for example, multiple units or components may be combined or integrated into another system, or some features may be ignored or not performed. On the other hand, the coupling or direct coupling or communication connection between each other illustrated or discussed may be indirect coupling or communication connection through some interface, device or unit, and may be electrical, mechanical or other form.

The units illustrated as separate elements may or may not be physically separated, and the elements displayed as units may or may not be physical units, i.e. may be located in a place, or may be distributed over a plurality of network units. Part or all of the units may be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

When the functions are realized in a form of a software functional unit and sold or used as an independent product, they may be stored in a computer readable storage medium. Based on such an understanding, the technical solutions according to the disclosure, in essence or the part contributing to the prior art, or part of the technical solutions may be embodied in the form of a software product. The computer software product is stored in a storage medium, and includes several instructions so that a computer device (which may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art may easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A method for paging indication, comprising:
receiving, by a terminal device, a paging message from a first network, the first network being a network corresponding to a first communication card of the terminal device,
wherein the paging message carries at least one information unit, and each information unit of the at least one information unit is used to indicate at least one of the following information of a paged terminal device: a paging cause, or slice information; and
determining, by the terminal device, whether to respond to the paging message based on the information indicated by the at least one information unit,
wherein the paging message carries a first bitmap, and a number of N bits in the first bitmap form one information unit, N being a positive integer,
wherein a value of the N bits is used to indicate information content indicated by the information unit corresponding to the N bits,
wherein a correspondence between the value of the N bits and the information content indicated by the N bits is agreed by a protocol or is configured by system broadcast information.

2. The method of claim 1, wherein the first bitmap comprises a number of M bits, a value of the M is associated with a number of paging records contained in a first paging record list, M being a positive integer.

3. The method of claim 2, wherein the value of the M is the number of paging records contained in the first paging record list multiplied by N.

4. The method of claim 2, wherein the first paging record list comprises a number of P paging records, P being a positive integer; and
wherein every N bits in the first bitmap in an order from low bit to high bit have a correspondence with one information unit, the first bitmap having a correspondence with P information units, and the P information units having a one-to-one correspondence with the P paging records.

5. The method of claim 1, wherein the slice information indicated by the information unit is carried in a paging record corresponding to the information unit in a first paging record list, and each paging record in the first paging record list further carries at least one of the following: a terminal device identification or an access type.

6. The method of claim 1, wherein the slice information indicated by the information unit is carried in a paging record corresponding to the information unit in a second paging record list, paging records in the second paging record list have a one-to-one correspondence with paging records in the first paging record list, and each paging record in the first paging record list carries at least one of the following: a terminal device identification or an access type.

7. The method of claim 1, wherein the slice information comprises at least one of: slice identification, slice type or slice indication information; and the slice indication information has a correspondence with the slice identification.

8. The method of claim 7, wherein the correspondence between the slice indication information and the slice identification is agreed by a protocol, or configured by system broadcast information, or configured by a radio resource control (RRC) signaling, or configured by a non-access layer (NAS) signaling.

9. The method of claim 1, further comprising:

receiving, by the terminal device, system broadcast information from the first network, the system broadcast information carrying second indication information and third indication information, wherein the second indication information is used to indicate whether the first network supports transmission of the information unit or the paging cause; and the third indication information is used to indicate whether the first network supports reception of leaving indication information or busy indication information from the terminal device.

10. The method of claim 9, further comprising:

in response to that the second indication information indicates that the first network supports transmission of the information unit or the paging cause, determining, by the terminal device after receiving the paging message, whether to respond to the paging message through the information unit or the paging cause in the paging message; or in response to that the second indication information indicates that the first network does not support transmission of the information unit or the paging cause, accessing, by the terminal device after receiving the paging message, the first network and determining, by the terminal device, whether to remain in the first network or leave the first network.

11. The method of claim 9, further comprising:

in response to that the third indication information indicates that the first network supports reception of the leaving indication information or the busy indication information from the terminal device, transmitting, by the terminal device, a message carrying the leaving indication information or the busy indication information.

12. A terminal device, comprising: a processor, a memory for storing a computer program; and a transceiver, wherein the processor is configured to call and execute the computer program stored in the memory to control the transceiver to perform reception or transmission of signals, to cause the terminal device to:

receive a paging message from a first network, the first network being a network corresponding to a first communication card of the terminal device, wherein the paging message carries at least one information unit, and each information unit of the at least one information unit is used to indicate at least one of the following information of a paged terminal device: a paging cause, or slice information; and determine whether to respond to the paging message based on the information indicated by the at least one information unit, wherein the paging message carries a first bitmap, and a number of N bits in the first bitmap form one information unit, N being a positive integer, wherein a value of the N bits is used to indicate information content indicated by the information unit corresponding to the N bits, wherein a correspondence between the value of the N bits and the information content indicated by the N bits is agreed by a protocol or is configured by system broadcast information.

13. The terminal device of claim 12, wherein the first bitmap comprises a number of M bits, a value of the M is associated with a number of paging records contained in a first paging record list, M being a positive integer.

14. The terminal device of claim 13, wherein the value of the M is the number of paging records contained in the first paging record list multiplied by N.

15. The terminal device of claim 13, wherein the first paging record list comprises a number of P paging records, P being a positive integer; and wherein every N bits in the first bitmap has correspondences in an order from low bit to high bit have a correspondence with one information unit, the first bitmap having a correspondence with P information units, and the P information units having a one-to-one correspondence with the P paging records.

16. The terminal device of claim 12, wherein the processor is configured to call and execute the computer program stored in the memory to control the transceiver to perform reception or transmission of signals, to cause the terminal device to:

receive system broadcast information from the first network, the system broadcast information carrying second indication information and third indication information, wherein the second indication information is used to indicate whether the first network supports transmission of the information unit or the paging cause; and the third indication information is used to indicate whether the first network supports reception of leaving indication information or busy indication information from the terminal device.

17. The terminal device of claim 16, wherein the processor is configured to call and execute the computer program stored in the memory to cause the terminal device to:

in response to that the second indication information indicates that the first network supports transmission of the information unit or the paging cause, after receiving the paging message, determine whether to respond to the paging message through the information unit or the paging cause in the paging message; or in response to that the second indication information indicates that the first network does not support transmission of the information unit or the paging cause, after receiving the paging message, access the first network and determine whether to remain in the first network or leave the first network.

18. The terminal device of claim 16, wherein the processor is configured to call and execute the computer program stored in the memory to control the transceiver to perform reception or transmission of signals, to cause the terminal device to:

in response to that the third indication information indicates that the first network supports reception of the leaving indication information or the busy indication information from the terminal device, transmit a message carrying the leaving indication information or the busy indication information.

19. A first network, comprising: a processor, a memory for storing a computer program, and a transceiver, wherein the processor is configured to call and execute the computer program stored in the memory to control the transceiver to perform reception or transmission of signals, to cause the first network to:

transmit a paging message to a terminal device, the first network being a network corresponding to a first communication card of the terminal device;

wherein the paging message carries at least one information unit, and each information unit of the at least one information unit is used to indicate at least one of the following information of a paged terminal device: a paging cause, or slice information, wherein the information indicated by the at least one information unit is used for the terminal device to determine whether to respond to the paging message,     wherein the paging message carries a first bitmap, and a number of N bits in the first bitmap form one information unit, N being a positive integer,     wherein a value of the N bits is used to indicate information content indicated by the information unit corresponding to the N bits,     wherein a correspondence between the value of the N bits and the information content indicated by the N bits is agreed by a protocol or is configured by system broadcast information.

20. The first network of claim 19, wherein the processor is configured to call and execute the computer program stored in the memory to control the transceiver to perform reception or transmission of signals, to cause the first network to:

transmit system broadcast information, the system broadcast information carrying second indication information and third indication information, wherein the second indication information is used to indicate whether the first network supports transmission of the information unit or the paging cause; and the third indication information is used to indicate whether the first network supports reception of leaving indication information or busy indication information from the terminal device.

* * * * *